United States Patent
Paranthaman et al.

(10) Patent No.: US 12,197,944 B2
(45) Date of Patent: Jan. 14, 2025

(54) SYSTEM AND METHOD FOR MODERNIZATION OF LEGACY BATCH BASED ON FUNCTIONAL CONTEXT

(71) Applicant: Tata Consultancy Services Limited, Mumbai (IN)

(72) Inventors: Balakumar Paranthaman, Chennai (IN); Aashish Chandra, Gurgaon (IN); Kader Muhideen Varusai Iqbal, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 479 days.

(21) Appl. No.: 17/646,733

(22) Filed: Jan. 3, 2022

(65) Prior Publication Data

US 2022/0365812 A1    Nov. 17, 2022

(30) Foreign Application Priority Data

Apr. 7, 2021   (IN) .............................. 202121016400

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | |
|---|---|---|---|
| 8,650,225 B2 | 2/2014 | Barrenechea | |
| 8,869,165 B2 | 10/2014 | Dasgupta et al. | |
| 9,256,472 B2 | 2/2016 | Kakade et al. | |
| 9,703,594 B1* | 7/2017 | Kamboj | G06F 9/485 |
| 10,324,773 B2 | 6/2019 | Wing et al. | |
| 11,042,369 B1* | 6/2021 | Kimball | G06F 9/4843 |
| 2014/0019977 A1* | 1/2014 | Kakade | G06F 9/5072 718/101 |

(Continued)

OTHER PUBLICATIONS

M. Shahid, Z. Raza and M. Alam, "Performance Evaluation of Batch Scheduling Strategy with Precedence Constraints for Computational Grid," 2018 8th International Conference on Cloud Computing, Data Science & Engineering (Confluence), Noida, India, 2018, pp. 641-646. (Year: 2018).*

*Primary Examiner* — Frank D Mills

(74) *Attorney, Agent, or Firm* — FINNEGAN, HENDERSON, FARABOW, GARRETT & DUNNER LLP

(57) ABSTRACT

This disclosure relates generally to method of modernizing a legacy batch based on at least one functional context. The method includes at least one of: preprocessing, a plurality of metadata associated with a plurality of batches to obtain a plurality of derived data; generating, the functional context based on the plurality of derived data; determining, an average elapsed time for at least one application from the at least one functional context; parsing, log of the at least one consistent long running job to identify step and associated file referenced in the at least one long running job; determining, a hotspot based on at least program; and recommending, at least one batch design associated with at least one batch job in a future state. The hotspot corresponds to long running job on a batch stream, high volume files, and program with an increased millions of instructions per second (MIPS) usage.

14 Claims, 5 Drawing Sheets

(56) References Cited

U.S. PATENT DOCUMENTS

| | | | |
|---|---|---|---|
| 2015/0089063 A1* | 3/2015 | Soni | H04L 47/70 |
| | | | 709/226 |
| 2015/0160934 A1* | 6/2015 | Beit-Aharon | G06F 8/76 |
| | | | 717/137 |
| 2017/0192758 A1 | 7/2017 | Apte et al. | |

* cited by examiner

SYSTEM AND METHOD FOR MODERNIZATION OF LEGACY BATCH BASED ON FUNCTIONAL CONTEXT

PRIORITY CLAIM

This U.S. patent application claims priority under 35 U.S.C. § 119 to: India Application No. 202121016400, filed on 7 Apr. 2021. The entire contents of the aforementioned application are incorporated herein by reference.

TECHNICAL FIELD

This disclosure relates generally to information technology, and, more particularly, to system and method for modernization of legacy batch based on functional context.

BACKGROUND

Legacy applications which are outdated needs to be modernized to next generation architecture involving lot of complexities and typically these transformation programs run for longer timelines. Legacy platforms like Mainframes are known for batch processing involving high volume of data. Transformation of batch process requires deep study of legacy batch jobs, their technical and functional context. There are lot of complexities in understanding and transforming batch process which are developed using legacy code to meet current business needs. Modernization of legacy batch processes involves more manual efforts around critical areas such as understanding overall functional context, identification of batch hotspots, available batch window and batch definition. Insights gathered from the above critical areas needs to be connected to put together holistic view on next generation batch platform. Also, there are lot of challenges to make distributed or next generation platform to meet one or more current processing standards, more design pointers or thoughts needs to be put forward in picking up the right batch pattern and design the modern batch platform to handle the workload in effective manner. This traditional approach requires lot of manual effort and time.

SUMMARY

Embodiments of the present disclosure present technological improvements as solutions to one or more of the above-mentioned technical problems recognized by the inventors in conventional systems. For example, in one aspect, a processor implemented method of modernizing a legacy batch based on at least one functional context is provided. The processor implemented method includes at least one of: preprocessing, via one or more hardware processors, a plurality of metadata associated with a plurality of batches to obtain a plurality of derived data; generating, via the one or more hardware processors, the at least one functional context based on the plurality of derived data; determining, via the one or more hardware processors, an average elapsed time for at least one application from the at least one functional context; parsing, via the one or more hardware processors, log of the at least one consistent long running job to identify at least one step and associated file referenced in the at least one long running job; determining, via the one or more hardware processors, a hotspot based on at least program; and recommending, via the one or more hardware processors, at least one batch design associated with at least one batch job in a future state. In an embodiment, an at least one job is determined with an elapsed time more than the average elapsed time and an at least one consistent long running job. In an embodiment, the hotspot corresponds to at least one: (a) at least one long running job on a batch stream, (b) high volume files, and (c) at least one program with an increased millions of instructions per second (MIPS) usage. In an embodiment, the at least one batch design corresponds to at least one: (a) an event based on at least one micro batch job, (b) a parallel job threads for high volume jobs, (c) an extract transform load, and combination thereof.

In an embodiment, the plurality of metadata corresponds to at least one of: (a) a plurality of batch jobs, (b) a plurality of metrics associated with at least one job, and (c) a plurality of central processing unit (CPU) metrics. In an embodiment, the derived data corresponds to at least one: (a) job related definitions provide at least one job descriptions, predecessor, successor, requirements; (b) job frequency, no of job runs, a job schedule, priority of batch workflow, batch job association with SLA; (c) job run time details, (d) high volumetric processing jobs, (e) long running jobs, and (f) high CPU consuming jobs. In an embodiment, the step of generating the at least one functional context further include: (a) at least one batch stream corresponding to at least one application is identified from a scheduler (202) to determine frequency and schedule for the at least one batch stream; (b) a batch flow structure associated with the hotspot is generated from the plurality of derived data corresponding to the at least one batch stream; and (c) a plurality of utilities used in a job control language (JCL) is mapped with at least one pre-defined utility template to create at least one functional context for at least one step in the batch jobs. In an embodiment, the step of mapping is further configurable to map related utilities present in the job to an equivalent functional context. In an embodiment, the at least one pre-defined utility template comprises at least one configurable parameter. In an embodiment, the at least one configurable parameter corresponds to at least one: (a) a parameter name, (b) a parameter type, and (c) a parameter description. In an embodiment, a plurality of overall summary of jobs is generated in the at least one batch stream. In an embodiment, a summarization of at least one rule from a plurality of rules extracted from the at least one program is mapped and executed in the jobs to create the at least one functional context for at least one step in the at least one batch job.

In another aspect, there is provided a system for modernization of a legacy batch based on at least one functional context. The system comprises a memory storing instructions; one or more communication interfaces; and one or more hardware processors coupled to the memory via the one or more communication interfaces. The one or more hardware processors are configured by the instructions to: preprocess, a plurality of metadata associated with a plurality of batches to obtain a plurality of derived data; generate, at least one functional context based on the plurality of derived data; determine, an average elapsed time for at least one application from the at least one functional context; parse, log of the at least one consistent long running job to identify at least one step and associated file referenced in the at least one long running job; determine, a hotspot based on at least program; and recommend, at least one batch design associated with at least one batch job in a future state. In an embodiment, an at least one job is determined with an elapsed time more than the average elapsed time and an at least one consistent long running job. In an embodiment, the hotspot corresponds to at least one: (a) at least one long running job on a batch stream, (b) high volume files, and (c) at least one program with an increased millions of instructions per second (MIPS) usage. In an embodiment, the at least one batch design corresponds to at least one: (a) an event based on at least one micro batch job, (b) a parallel job threads for high volume jobs, (c) an extract transform load, and combination thereof.

In an embodiment, the plurality of metadata corresponds to at least one of: (a) a plurality of batch jobs, (b) a plurality of metrics associated with at least one job, and (c) a plurality of central processing unit (CPU) metrics. In an embodiment, the derived data corresponds to at least one: (a) job related definitions provide at least one job descriptions, predecessor, successor, requirements; (b) job frequency, no of job runs, a job schedule, priority of batch workflow, batch job association with SLA; (c) job run time details, (d) high volumetric processing jobs, (e) long running jobs, and (f) high CPU consuming jobs. In an embodiment, the step of generating the at least one functional context further include: (a) at least one batch stream corresponding to at least one application is identified from a scheduler (202) to determine frequency and schedule for the at least one batch stream; (b) a batch flow structure associated with the hotspot is generated from the plurality of derived data corresponding to the at least one batch stream; and (c) a plurality of utilities used in a job control language (JCL) is mapped with at least one pre-defined utility template to create at least one functional context for at least one step in the batch jobs. In an embodiment, the step of mapping is further configurable to map related utilities present in the job to an equivalent functional context. In an embodiment, the at least one pre-defined utility template comprises at least one configurable parameter. In an embodiment, the at least one configurable parameter corresponds to at least one: (a) a parameter name, (b) a parameter type, and (c) a parameter description. In an embodiment, a plurality of overall summary of jobs is generated in the at least one batch stream. In an embodiment, a summarization of at least one rule from a plurality of rules extracted from the at least one program is mapped and executed in the jobs to create the at least one functional context for at least one step in the at least one batch job.

In yet another aspect, there are provided one or more non-transitory machine-readable information storage mediums comprising one or more instructions which when executed by one or more hardware processors causes at least one of: preprocessing, a plurality of metadata associated with a plurality of batches to obtain a plurality of derived data; generating, the at least one functional context based on the plurality of derived data; determining, an average elapsed time for at least one application from the at least one functional context; parsing, log of the at least one consistent long running job to identify at least one step and associated file referenced in the at least one long running job; determining, a hotspot based on at least program; and recommending, at least one batch design associated with at least one batch job in a future state. In an embodiment, an at least one job is determined with an elapsed time more than the average elapsed time and an at least one consistent long running job. In an embodiment, the hotspot corresponds to at least one: (a) at least one long running job on a batch stream, (b) high volume files, and (c) at least one program with an increased millions of instructions per second (MIPS) usage. In an embodiment, the at least one batch design corresponds to at least one: (a) an event based on at least one micro batch job, (b) a parallel job threads for high volume jobs, (c) an extract transform load, and combination thereof.

In an embodiment, the plurality of metadata corresponds to at least one of: (a) a plurality of batch jobs, (b) a plurality of metrics associated with at least one job, and (c) a plurality of central processing unit (CPU) metrics. In an embodiment, the derived data corresponds to at least one: (a) job related definitions provide at least one job descriptions, predecessor, successor, requirements; (b) job frequency, no of job runs, a job schedule, priority of batch workflow, batch job association with SLA; (c) job run time details, (d) high volumetric processing jobs, (e) long running jobs, and (f) high CPU consuming jobs. In an embodiment, the step of generating the at least one functional context further include: (a) at least one batch stream corresponding to at least one application is identified from a scheduler (202) to determine frequency and schedule for the at least one batch stream; (b) a batch flow structure associated with the hotspot is generated from the plurality of derived data corresponding to the at least one batch stream; and (c) a plurality of utilities used in a job control language (JCL) is mapped with at least one pre-defined utility template to create at least one functional context for at least one step in the batch jobs. In an embodiment, the step of mapping is further configurable to map related utilities present in the job to an equivalent functional context. In an embodiment, the at least one pre-defined utility template comprises at least one configurable parameter. In an embodiment, the at least one configurable parameter corresponds to at least one: (a) a parameter name, (b) a parameter type, and (c) a parameter description. In an embodiment, a plurality of overall summary of jobs is generated in the at least one batch stream. In an embodiment, a summarization of at least one rule from a plurality of rules extracted from the at least one program is mapped and executed in the jobs to create the at least one functional context for at least one step in the at least one batch job.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
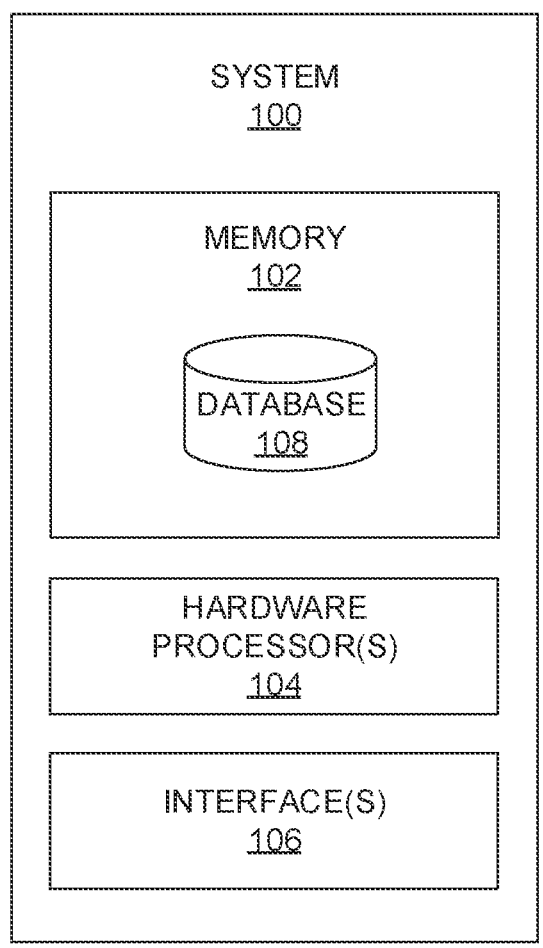
FIG. 1 illustrates a system for modernization of legacy batch based on at least one functional context, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 4B, where similar reference characters denote corresponding features consistently throughout the figures, there are shown preferred embodiments and these embodiments are described in the context of the following exemplary system and/or method.

FIG. 1 illustrates a system 100 for modernization of legacy batch based on at least one functional context, according to some embodiments of the present disclosure. In an embodiment, the system 100 includes one or more hardware processor(s) 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology. The repository, amongst other things, includes a system database and other data. The other data may include data generated as a result of the execution of one or more modules in the plurality of modules. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
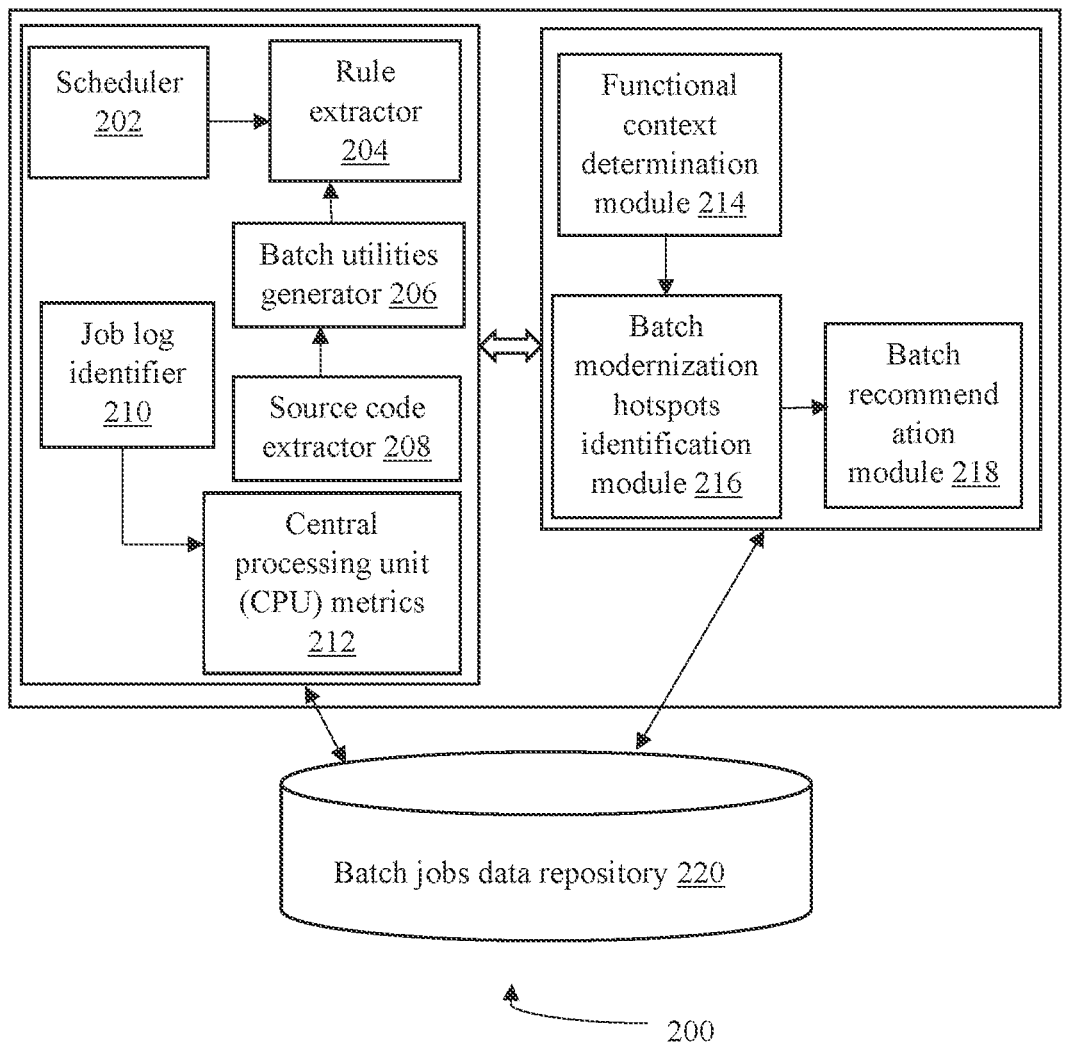
FIG. 2 illustrates an exemplary system for modernization of the legacy batch based on the at least one functional context, according to some embodiments of the present disclosure.

FIG. 2 illustrates an exemplary system 200 for modernization of the legacy batch based on the at least one functional context, according to some embodiments of the present disclosure. The system 200 includes a scheduler 202, a rule extractor 204, a batch utilities generator 206, a source code extractor 208, a job log identifier 210, a central processing unit (CPU) metrics 212. The system 200 is configured with one or more parsers or processors to process one or more metadata to obtain one or more derived data. In an embodiment, the one or more metadata associated with one or more batches are preprocessed to obtain one or more derived data. In an embodiment, the one or more derived data are obtained from the scheduler 202, the rule extractor 204, the batch utilities generator 206, the source code extractor 208, the job log identifier 210, and the central processing unit (CPU) metrics 212. In an embodiment, a data associated with one or more jobs are defined in the scheduler 202. In an embodiment, one or more data related to the batch jobs can be downloaded to derive more insights around the batch not limiting to the embodiments: (a) job related definitions e.g., one or more job descriptions, predecessor, successor, requirements, and job descriptions; (b) job frequency (e.g., every N minutes, hourly, daily, monthly, weekly, quarterly or yearly), number of job runs, job schedule, priority of batch workflow, batch job association with SLA; (c) Job run time information e.g., Start time, end time, elapsed time, long running, average elapsed time. A batch flow structure is generated from the one or more derived data corresponding to the at least one batch stream. In an embodiment, one or more programs used in the batch jobs are considered to extract a summary of the programs used in the batch jobs.

The batch utilities generator 206 is configured to derive one or more utilities of one or more job control language (JCL), context associated with the one or more utilities of the one or more job control language (JCL), and context reference associated with the one or more utilities of the one or more job control language (JCL). In an embodiment, the one or more utilities of the one or more job control language (JCL) corresponds to one or more functional elements of the job e.g., delete file, sort file etc. The one or more utilities used in one or more job control language (JCL) are mapped with at least one pre-defined utilities template to create at least one functional context for at least one step in the batch jobs. In an embodiment, a list of files used and map the list of files to relevant functional context. For example, if at least one file is not already mapped, then mapping of files to relevant functional context is created and the step is reiterated. A plurality of overall summary of jobs is generated in the at least one batch stream. The rule extractor 204 is configured to extract list of rules from the information associated with the scheduler 202 and the batch utilities generator 206. The rule extractor 204 is configured to extract a summary of at least one rule from the list of rules of at least one program utilized in the batch jobs. In an embodiment, the summary of the at least one rule is extracted from at least one: (a) summary of program and inventory, and (b) tagging of programs to domain/sub domain.

The source code extractor 208 is configured to extract source code for one or more JCL based on the source code.

The one or more utilities of the one or more job control language (JCL) coded in the source code are mapped to a relevant context using data from the batch utilities generator 206, to derive at least one of: (a) job to file cross reference, (b) one or more JCL mapping to domain, and combination thereof. The job logger 210 is configured to derive one or more data related to job run logs and are aligned to archive. The job run logs can be parsed to derive long running jobs, job volume related data, job elapsed time data. The central processing unit (CPU) metrics 212 is configured to derive one or more CPU jobs or one or more high CPU consuming jobs based on one or more data related to one or more compute cycles taken up by programs or jobs. The one or more derived data are stored in a batch job data repository 220. In an embodiment, one or more intermediate files during the data processing can be stored in file storage of the database 108 in the system 100.

In an embodiment, summarization of the one or more rules generated from the programs which are utilized by parsing the list of programs and the list of rules extracted from the program by referring to a rule repository. The JCL utilities to context are mapped to the list of utilities used in the batch job source code. Data derived from the metadata of the one or more jobs are processed and the one or more derived data are processed, functional and technical diagram are created. In an embodiment, the one or more job flows are depicted in a graphical representation. For example, the one or more job flows are depicted in a pictorial representation i.e., a flow chart.

The one or more derived data are processed to identify one or more batch modernization hotspots. For example, a CPU (compute cycles) for the jobs is compared with average CPU for the one or more applications, from which the one or more hotspots can be identified. From the job log identifier 208 another example could be around identification of files with large volume which could be identified and job to file cross reference are used to identify the one or more hotspots on a high-volume path. The one or more data derived from the job log identifier 208, the central processing unit (CPU) metrics 210, the scheduler 202, the rule extractor 204, the JCL source reference, and the JCL utilities mapping are utilized to determine possible batch recommendation. For example, a micro batch and number of business rules for which recommendation can be made to transform to event-based architecture. Alternatively, in case of preference with a cloud strategy, relevant cloud components related to event-based architecture are recommended.

Figure 3:
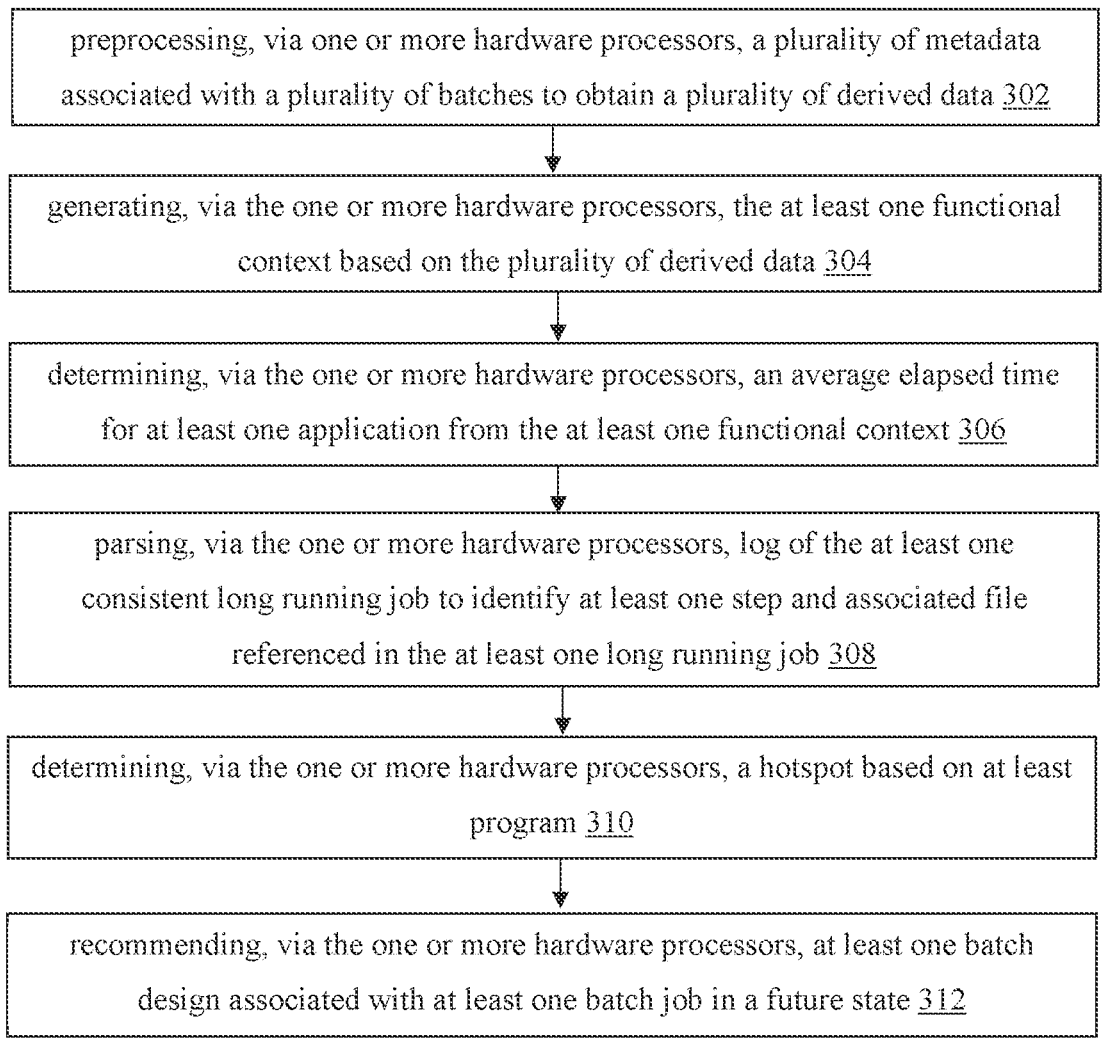
FIG. 3 is an exemplary flow diagram illustrating a method of modernizing of the legacy batch based on the at least one functional context, according to some embodiments of the present disclosure.

FIG. 3 is an exemplary flow diagram illustrating a method of modernizing of the legacy batch based on the at least one functional context, according to some embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system as depicted in FIGS. 1 and 2.

At step 302, a plurality of metadata associated with a plurality of batches is preprocessed to obtain a plurality of derived data. At step 304, the at least one functional context is generated based on the plurality of derived data. At step 306, an average elapsed time is determined for at least one application from the at least one functional context. In an embodiment, an at least one job is determined with an elapsed time more than the average elapsed time and an at least one consistent long running job. At step 308, log of the at least one consistent long running job is parsed to identify at least one step and associated file referenced in the at least one long running job. At step 310, a hotspot is determined based on at least one program. The hotspot corresponds to at least one: (a) at least one long running job on a batch stream, (b) high volume files, and (c) at least one program with an increased millions of instructions per second (MIPS) usage. At step 312, at least one batch design associated with at least one batch job is recommended in a future state. The at least one batch design corresponds to at least one: (a) an event based on at least one micro batch job, (b) a parallel job threads for high volume jobs, (c) an extract transform load, and combination thereof. The extract transform load refers to extracting data from source application, transform the extracted data using one or more transformations to match the output format required by target application, load the data into target application.

In an embodiment, the plurality of metadata corresponds to at least one of: (a) a plurality of batch jobs, (b) a plurality of metrics associated with at least one job, and (c) a plurality of central processing unit (CPU) metrics. In an embodiment, the derived data corresponds to at least one: (a) job related definitions provide at least one job descriptions, predecessor, successor, requirements; (b) job frequency, no of job runs, a job schedule, priority of batch workflow, batch job association with SLA; (c) job run time details, (d) high volumetric processing jobs, (e) long running jobs, and (f) high CPU consuming jobs. In an embodiment, the step of generating the at least one functional context further include: (a) at least one batch stream corresponding to at least one application is identified from a scheduler (202) to determine frequency and schedule for the at least one batch stream; (b) a batch flow structure associated with the hotspot is generated from the plurality of derived data corresponding to the at least one batch stream; and (c) a plurality of utilities used in a job control language (JCL) is mapped with at least one predefined utility template to create at least one functional context for at least one step in the batch jobs. In an embodiment, the step of mapping is further configurable to map related utilities present in the job to an equivalent functional context. In an embodiment, the at least one pre-defined utility template comprises at least one configurable parameter. In an embodiment, the at least one configurable parameter corresponds to at least one: (a) a parameter name, (b) a parameter type, and (c) a parameter description. In an embodiment, a plurality of overall summary of jobs is generated in the at least one batch stream. In an embodiment, a summarization of at least one rule from a plurality of rules extracted from the at least one program is mapped and executed in the jobs to create the at least one functional context for at least one step in the at least one batch job.

Figure 4A:
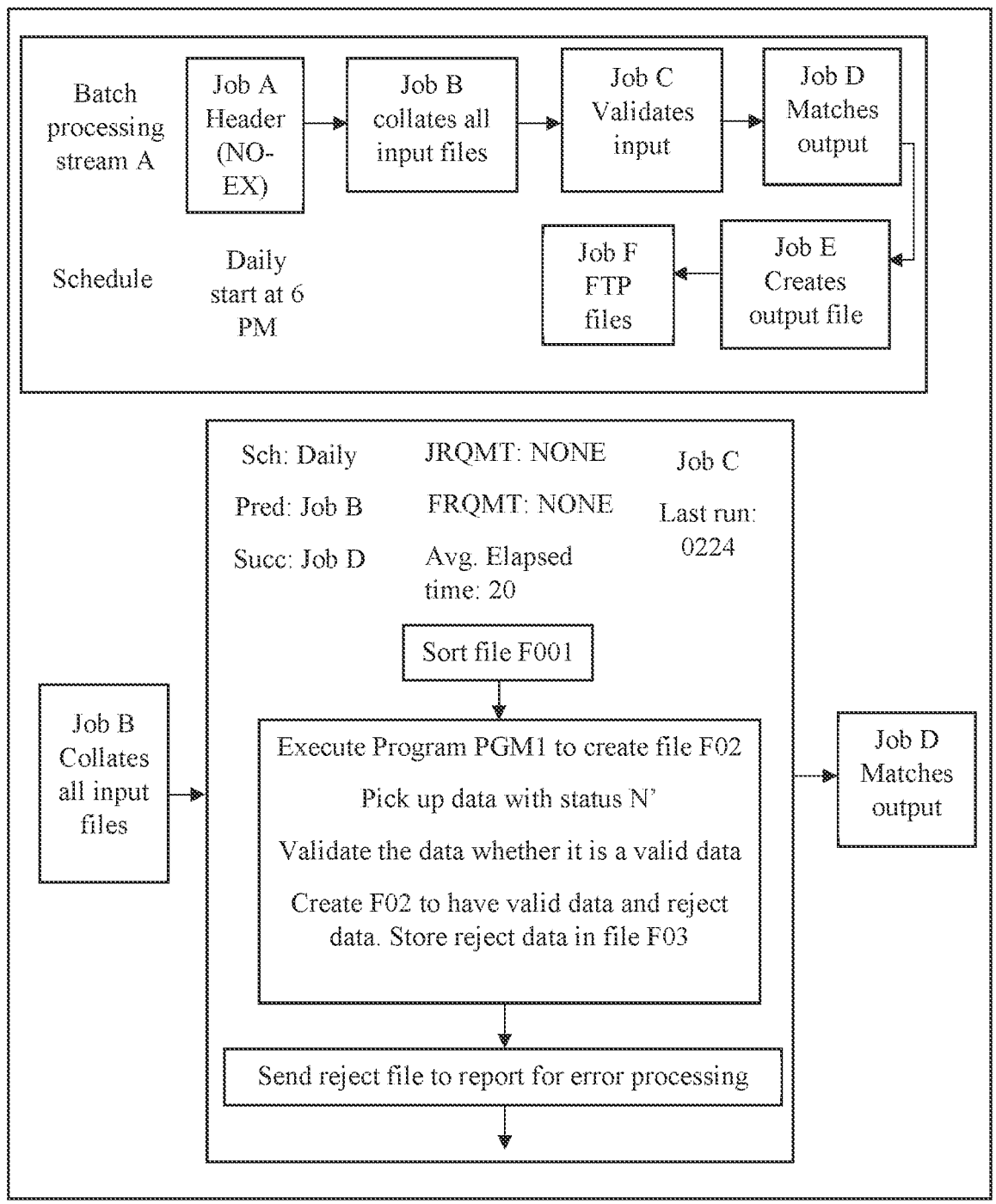
FIG. 4A is an exemplary block view illustrates a job stream, according to some embodiments of the present disclosure.

FIG. 4A is an exemplary block view illustrates the job stream, according to some embodiments of the present disclosure. The block view shows one of the batch stream with details on jobs, derived data like batch start time, frequency along with summary of the job stream. This also provide additional details on specific batch job C where metadata related to job C are processed and the one or more batch utilities present and programs in the Job C are mapped to create at least one or more functional context with additional derived data.

Figure 4B:
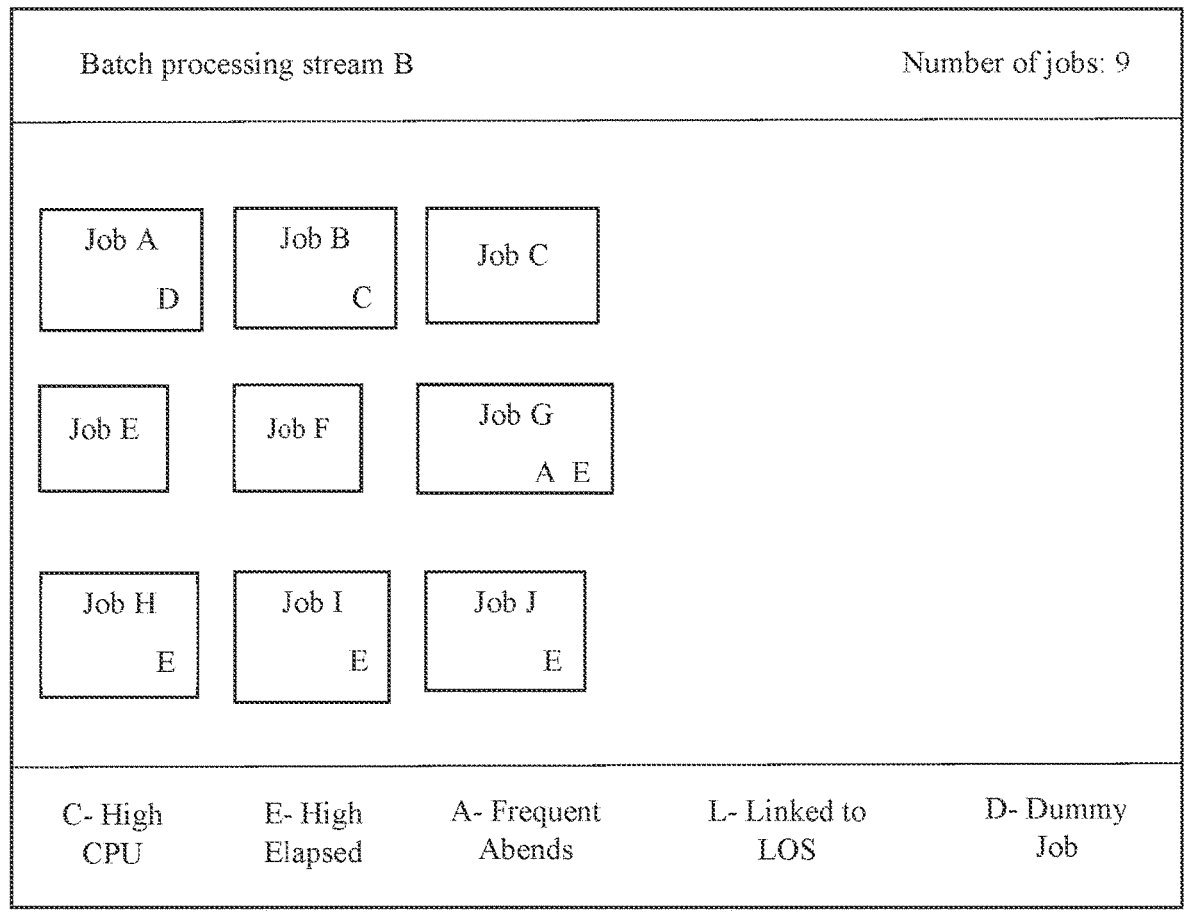
FIG. 4B is an exemplary block view illustrates an additional insights on the job stream when analyzed, according to some embodiments of the present disclosure.

FIG. 4B is an exemplary block view illustrates an at least one additional insight on the job stream when analyzed, according to some embodiments of the present disclosure.

The block view illustrates an additional insights on batch processing stream B where the jobs related to the batch processing stream B are listed as separate blocks and all the insights derived from the metadata and additional data. The additional insights are highlighted as at least one hotspot which includes (i) dummy job (D) indicates that the job (Job A) which does not have any steps, (ii) High Elapsed (E) indicates the list of jobs (Jobs G,H,I,J) with elapsed time higher than average elapsed time, (iii) Frequent Abends (A) indicates that job (job G) having more no of error runs, (iv) Linked to LOS(L) indicates the jobs are linked to SLA, (v) High CPU (C) indicates the jobs (Job B) with more CPU metrics.

The embodiments of present disclosure herein address unresolved problem of high manual effort and time taken for modernization of the legacy applications to next generation architecture. The embodiments of the present disclosure provide a significant technically improved approach to transform legacy batch by providing clear and concise information on the overall functional and technical context on one or more existing legacy batch processes, batch modules or areas which needs special focus on design as it might be consuming more compute cycles or run time, batch jobs which are processing huge volume of data. The embodiments of the present disclosure provide additional insights, batch transformation program with one or more advantages: a) ability to choose the right batch design pattern and architecture components based on the functional and technical context (for e.g., if the functional or technical context for any batch application indicates an event based processing then future batch platform can choose event based architectural components to meet the current standards), (b) Minimize rework arising out of issues related to architectural or functional gaps, (c) Provide early insights on the list of areas for design team, (d) ability to significantly reduce the batch transformation analysis and design timelines i.e., manual efforts, (e) ability to meet the current processing batch standards resulting in overall success of the batch transformation initiatives.

The embodiments of present disclosure herein deliver the batch modernization in faster pace and modernized batch platforms can deliver the same standards as legacy platform in terms of performance, compute cycles, data volumes. The embodiments of present disclosure herein are capable to create the functional flow by parsing the model repository and the metadata obtained from the scheduler. The embodiments of present disclosure herein are further capable to highlight one or more hotspot areas by parsing the CPU, elapsed metrics. The embodiments of present disclosure herein are further capable to provide recommendations for future state architecture. The embodiments of present disclosure herein in which static analyzer provides each program level functional flow but for better understanding from a logical batch stream perspective which includes the files, SORT, FTP functions along with the program level understanding.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of modernizing a legacy batch
   based on at least one functional context, comprising:
   preprocessing, via one or more hardware processors, a plurality of metadata associated with a plurality of batches having one or more jobs to obtain a plurality of derived data, wherein the plurality of derived data corresponds to at least one: (a) job related definitions provide at least one job descriptions, predecessor, successor, requirements; (b) job frequency, number of job runs, a job schedule, priority of batch workflow, batch job association with SLA; (c) job run time details, (d) high volumetric processing jobs, (e) long running jobs, and (f) high CPU consuming jobs;
   generating, via the one or more hardware processors, the at least one functional context based on the plurality of derived data, wherein the step of generating the at least one functional context comprises:
   (a) identifying, from a scheduler, at least one batch stream corresponding to at least one application to determine frequency and schedule for the at least one batch stream;
   (b) generating, via the one or more hardware processors, a batch flow structure associated with a batch hotspot from the plurality of derived data corresponding to the at least one batch stream; and
   (c) mapping, via the one or more hardware processors, a plurality of utilities used in a job control language (JCL) with at least one pre-defined utility template to create at least one functional context for at least one step in the batch jobs;
   determining, via the one or more hardware processors, an average elapsed time for at least one application from the at least one functional context, wherein an at least one job is determined with an elapsed time more than the average elapsed time and an at least one consistent long running job;
   parsing, via the one or more hardware processors, log of the at least one consistent long running job to identify at least one step and associated file referenced in the at least one consistent long running job;
   determining, via the one or more hardware processors, one or more batch hotspot for modernization using the file referenced in the at least one consistent long running job wherein the hotspot corresponds to at least one: (a) at least one long running job on a batch stream, (b) high volume files, and (c) at least one program with an increased millions of instructions per second (MIPS) usage; and
   recommending, via the one or more hardware processors, at least one batch design associated with at least one batch job in a future state to modernize the legacy batch based on at least one functional context for the determined one or more batch hotspot, wherein the at least one batch design corresponds to at least one: (a) an event based on at least one micro batch job, (b) a parallel job threads for high volume jobs, (c) an extract transform load, and combination thereof.

2. The processor implemented method as claimed in claim 1, wherein the plurality of metadata corresponds to at least one of: (a) a plurality of batch jobs, (b) a plurality of metrics associated with at least one job, and (c) a plurality of central processing unit (CPU) metrics.

3. The processor implemented method as claimed in claim 1, wherein the step of mapping is further configurable to map related utilities present in the job to an equivalent functional context, wherein the at least one pre-defined utility template comprises at least one configurable parameter, and wherein the at least one configurable parameter corresponds to at least one: (a) a parameter name, (b) a parameter type, and (c) a parameter description.

4. The processor implemented method as claimed in claim 1, further comprising, generating, via the one or more hardware processors, a plurality of overall summary of jobs in the at least one batch stream.

5. The processor implemented method as claimed in claim 1, further comprising, mapping, via the one or more hardware processors, a summarization of at least one rule from a plurality of rules extracted from the at least one program is executed in the jobs to create the at least one functional context for at least one step in the at least one batch job.

6. A system for modernization of a legacy batch based on at least one functional context, comprising:
   a memory storing instructions;
   one or more communication interfaces; and
   one or more hardware processors coupled to the memory via the one or more communication interfaces, wherein the one or more hardware processors are configured by the instructions to:
   preprocess, a plurality of metadata associated with a plurality of batches having one or more jobs to obtain a plurality of derived data, wherein the plurality of derived data corresponds to at least one: (a) job related definitions provide at least one job descriptions, predecessor, successor, requirements; (b) job frequency, number of job runs, a job schedule, priority of batch workflow, batch job association with SLA; (c) job run time details, (d) high volumetric processing jobs, (e) long running jobs, and (f) high CPU consuming jobs;
   generate, at least one functional context based on the plurality of derived data, wherein the step of generating the at least one functional context comprises:
   (a) identifying, from a scheduler, at least one batch stream corresponding to at least one application to determine frequency and schedule for the at least one batch stream;
   (b) generating, via the one or more hardware processors, a batch flow structure associated with a batch hotspot from the plurality of derived data corresponding to the at least one batch stream; and
   (c) mapping, via the one or more hardware processors, a plurality of utilities used in a job control language (JCL) with at least one pre-defined utility template to create at least one functional context for at least one step in the batch jobs;
   determine, an average elapsed time for at least one application from the at least one functional context, wherein an at least one job is determined with an elapsed time more than the average elapsed time and an at least one consistent long running job;
   parse, log of the at least one consistent long running job to identify at least one step and associated file referenced in the at least one consistent long running job;

determine, one or more batch hotspot for modernization using the file referenced in the at least one consistent long running job, wherein the hotspot corresponds to at least one: (a) at least one long running job on a batch stream, (b) high volume files, and (c) at least one program with an increased millions of instructions per second (MIPS) usage; and recommend, at least one batch design associated with at least one batch job in a future state to modernize the legacy batch based on at least one functional context for the determined one or more batch hotspot, wherein the at least one batch design corresponds to at least one: (a) an event based on at least one micro batch job, (b) a parallel job threads for high volume jobs, (c) an extract transform load, and combination thereof.

7. The system as claimed in claim 6, wherein the plurality of metadata corresponds to at least one of: (a) a plurality of batch jobs, (b) a plurality of metrics associated with at least one job, and (c) a plurality of central processing unit (CPU) metrics.

8. The system as claimed in claim 6, wherein the step of mapping is further configurable to map related utilities present in the job to an equivalent functional context, wherein the at least one pre-defined utility template comprises at least one configurable parameter, and wherein the at least one configurable parameter corresponds to at least one: (a) a parameter name, (b) a parameter type, and (c) a parameter description.

9. The system as claimed in claim 6, wherein the one or more hardware processors are further configured by the instructions to: generate a plurality of overall summary of jobs in the at least one batch stream.

10. The system as claimed in claim 6, wherein the one or more hardware processors are further configured by the instructions to: map a summarization of at least one rule from a plurality of rules extracted from the at least one program is executed in the jobs to create the at least one functional context for at least one step in the at least one batch job.

11. One or more non-transitory machine-readable information storage mediums comprising one or more instructions which when executed by one or more hardware processors causes:

preprocessing, a plurality of metadata associated with a plurality of batches having one or more jobs to obtain a plurality of derived data, wherein the plurality of derived data corresponds to at least one: (a) job related definitions provide at least one job descriptions, predecessor, successor, requirements; (b) job frequency, number of job runs, a job schedule, priority of batch workflow, batch job association with SLA; (c) job run time details, (d) high volumetric processing jobs, (e) long running jobs, and (f) high CPU consuming jobs;

generating, the at least one functional context based on the plurality of derived data, wherein the step of generating the at least one functional context comprises:

(a) identifying, from a scheduler at least one batch stream corresponding to at least one application to determine frequency and schedule for the at least one batch stream;

(b) generating, via the one or more hardware processors a batch flow structure associated with a batch hotspot from the plurality of derived data corresponding to the at least one batch stream; and (c) mapping, via the one or more hardware processors a plurality of utilities used in a job control language (JCL) with at least one pre-defined utility template to create at least one functional context for at least one step in the batch jobs;

determining, an average elapsed time for at least one application from the at least one functional context, wherein an at least one job is determined with an elapsed time more than the average elapsed time and an at least one consistent long running job;

parsing, log of the at least one consistent long running job to identify at least one step and associated file referenced in the at least one consistent long running job;

determining, one or more batch hotspot for modernization using the file referenced in the at least one consistent long running job, wherein the hotspot corresponds to at least one: (a) at least one long running job on a batch stream, (b) high volume files, and (c) at least one program with an increased millions of instructions per second (MIPS) usage; and recommending, at least one batch design associated with at least one batch job in a future state to modernize the legacy batch based on at least one functional context for the determined one or more batch hotspot, wherein the at least one batch design corresponds to at least one: (a) an event based on at least one micro batch job, (b) a parallel job threads for high volume jobs, (c) an extract transform load, and combination thereof.

12. The one or more non-transitory machine-readable information storage mediums of claim 11, wherein the step of mapping is further configurable to map related utilities present in the job to an equivalent functional context, wherein the at least one pre-defined utility template comprises at least one configurable parameter, and wherein the at least one configurable parameter corresponds to at least one: (a) a parameter name, (b) a parameter type, and (c) a parameter description.

13. The one or more non-transitory machine-readable information storage mediums of claim 11, wherein the step of the modernization of a legacy further comprises, generating, a plurality of overall summary of jobs in the at least one batch stream.

14. The one or more non-transitory machine-readable information storage mediums of claim 11, wherein the step of the modernization of a legacy further comprises, mapping, a summarization of at least one rule from a plurality of rules extracted from the at least one program is executed in the jobs to create the at least one functional context for at least one step in the at least one batch job.

* * * * *